United States Patent [19]
Richard

[11] Patent Number: 6,098,722
[45] Date of Patent: Aug. 8, 2000

[54] VERSATILE IMPLEMENT SYSTEM

[76] Inventor: Leroy J. Richard, 734 -- 13th Ave. East, West Fargo, N. Dak. 58078

[21] Appl. No.: 09/204,882

[22] Filed: Dec. 3, 1998

[51] Int. Cl.$^7$ ..................................................... A01B 39/22
[52] U.S. Cl. ........................ 172/763; 172/705; 172/681; 172/748; 172/264; 111/151; 111/156; 111/60; 111/52; 403/334
[58] Field of Search ..................................... 172/748, 752, 172/740, 762, 763, 705, 707, 681, 682, 683, 684, 3, 261, 264; 111/149, 151, 156, 59, 60, 62, 81, 52; 403/379.5, 378, 334

[56] References Cited

U.S. PATENT DOCUMENTS

| | | | |
|---|---|---|---|
| 3,101,790 | 8/1963 | Rice | 172/683 X |
| 4,219,947 | 9/1980 | Paladino | 172/683 X |
| 4,248,310 | 2/1981 | McWilliams | 172/763 X |
| 4,532,790 | 8/1985 | Nicholls | 172/705 X |
| 4,548,277 | 10/1985 | Dietrich, Sr. et al. | 172/705 X |
| 4,738,316 | 4/1988 | Wood | 172/763 X |
| 4,779,684 | 10/1988 | Schultz | 172/740 X |
| 4,964,351 | 10/1990 | Elmenhorst | 172/763 X |
| 5,255,617 | 10/1993 | Williams et al. | 172/740 X |
| 5,787,994 | 8/1998 | Friesen | 172/748 X |

*Primary Examiner*—Victor Batson
*Attorney, Agent, or Firm*—Michael S. Neustel

[57] ABSTRACT

A versatile implement system utilizing a single implement structure that is capable of being utilized as a grain planter, row crop planter, tiller or anhydrous applicator. The inventive device includes a conventional implement frame, a bracket, a pair of support arms connected to the bracket, a breakaway structure, a receiving arm having a tubular structure, a syncline shaped brace within the receiving arm, a shank member having a syncline end that is removably insertable into an open end of the receiving arm for mating connection with the brace, and an attachment connected to the shank opposite of the syncline end for performing a specific task. This structure allows a plurality of shank planters, anhydrous applicators, double-disc openers, corn planters or tillage attachments to be utilized upon a single implement frame. Varying row spacing such as 30, 15 and 7½ inch are achievable by removing specific planter attachments.

12 Claims, 3 Drawing Sheets

VERSATILE IMPLEMENT SYSTEM

BACKGROUND OF THE INVENTION

1. Field of the Invention

The present invention relates generally to farm implement devices and more specifically it relates to a versatile implement system for utilizing a single implement structure that is capable of being utilized as a grain planter, row crop planter, tiller or anhydrous applicator.

2. Description of the Prior Art

Implement devices have been in use for years. Typically, a conventional implement device will have only one use such as planting, digging or anhydrous applicator. Some implement devices allow attachment of other implement devices to perform multiple tasks simultaneously.

The problem with conventional implement devices is that they are generally capable of performing one task. This increases the farmer's overall machinery cost because he has to purchase an individual implement for each task he needs to accomplish. In addition, the farmer requires increased storage space because there is more than one implement device to store that can increase storage costs. In addition, if the farmer desires to switch over to another implement device pulled behind the tractor, he has to drive the tractor back to his farm to remove the implement device he was using, attach the new implement device and then drive back out to the field. This can be extremely time consuming especially if the field is a significant distance from the farm.

Examples of implement devices include U.S. Pat. No. 5,431,232 to Kirsch; U.S. Pat. No. 5,117,918 to Yamada et al; U.S. Pat. No. 5,248,000 to Goto et al; U.S. Pat. No. 4,267,783 to Hendrix et al; U.S. Pat. No. 5,666,892 to Tortella et al; U.S. Pat. No. 5,640,914 to Rawson which are all illustrative of such prior art.

Kirsch (U.S. Pat. No. 5,431,232) discloses a quick change mounted packer system which is basically a cultivator equipped with detachable harrows or detachable packer wheels.

Yamada et al (U.S. Pat. No. 5,117,918) discloses a cultivator blade supporting structure including a cultivator blade having a shank and a blade portion, a blade holder having a cavity for removably receiving the shank, and a rotational driving shank.

Goto et al (U.S. Pat. No. 5,248,000) discloses a harrowing device for harrowing a ground surface which includes a haulable frame. A pin is inserted into a hole of a blade holder and the shank to pivotally support a blade.

Hendrix et al (U.S. Pat. No. 4,267,783) discloses a seed bed preparation method and apparatus having a sub-soiler followed by a seed bed preparation tool and a planter.

Tortella et al (U.S. Pat. No. 5,666,892) discloses a combined farm machine performing all of the seeding operations in one pass.

While these devices may be suitable for the particular purpose to which they address, they are not as suitable as a single implement structure that is capable of being utilized as a grain planter, row crop planter, tiller or anhydrous applicator. The prior art devices are not capable of being utilized for different uses in the field as is the present invention.

In these respects, the versatile implement system according to the present invention substantially departs from the conventional concepts and designs of the prior art, and in so doing provides an apparatus primarily developed for the purpose of utilizing a single implement structure that is capable of being utilized as a grain planter, row crop planter, tiller or anhydrous applicator.

SUMMARY OF THE INVENTION

In view of the foregoing disadvantages inherent in the known types of implement devices now present in the prior art, the present invention provides a new versatile implement system construction wherein the same can be utilized as a single implement structure that is capable of being utilized as a grain planter, row crop planter, tiller or anhydrous applicator.

The general purpose of the present invention, which will be described subsequently in greater detail, is to provide a new versatile implement system that has many of the advantages of the implement devices mentioned heretofore and many novel features that result in a new versatile implement system which is not anticipated, rendered obvious, suggested, or even implied by any of the prior art implement devices, either alone or in any combination thereof.

To attain this, the present invention generally comprises a conventional implement frame, a bracket, a pair of support arms connected to the bracket, a breakaway structure, a receiving arm having a tubular structure, a syncline shaped brace within the receiving arm, a shank member having a syncline end that is removably insertable into an open end of the receiving arm for mating connection with the brace, and an attachment connected to the shank opposite of the syncline end for performing a specific task. This structure allows a plurality of shank planters, anhydrous applicators, double-disc openers, corn plants or tillage attachments to be utilized upon a single implement frame. Varying row spacing such as 30, 15 and 7½ inch are achievable by removing specific planter attachments.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a versatile implement system that will overcome the shortcomings of the prior art devices.

Another object is to provide a versatile implement system that is capable of being utilized as various different implement devices.

An additional object is to provide a versatile implement system that decreases the overall equipment costs to a farmer.

A further object is to provide a versatile implement system that reduces changeover time when converting from one implement to another.

Another object is to provide a versatile implement system that decreases the amount of storage space required.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
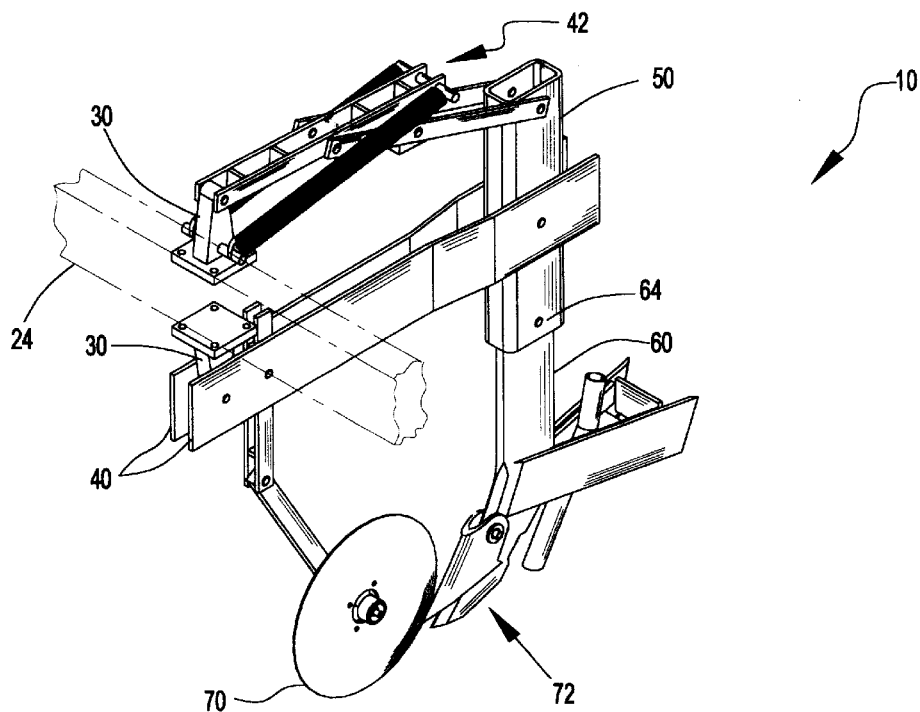
FIG. 1 is an upper perspective view of the present invention with a shank planter attached thereto.

Turning now descriptively to the drawings, in which similar reference characters denote similar elements throughout the several view, FIGS. 1 through 6 illustrate a versatile implement system 10, which comprises a conventional implement frame 20, a bracket, a pair of support arms 40 connected to the bracket 30, a breakaway structure 42, a receiving arm 50 having a tubular structure, a syncline shaped brace 54 within the receiving arm 50, a shank member 60 having a syncline end 66 that is removably insertable into an open end 52 of the receiving arm 50 for mating connection with the brace 54, and an attachment connected to the shank opposite of the syncline end 66 for performing a specific task. This structure allows a plurality of shank planters 72, anhydrous applicators 74, double-disc openers 76, corn planters 77 or tillage attachments 78 to be utilized upon a single implement frame 20. Varying row spacing such as 30, 15 and 7½ inch are achievable by removing specific planter attachments.

Figure 2:
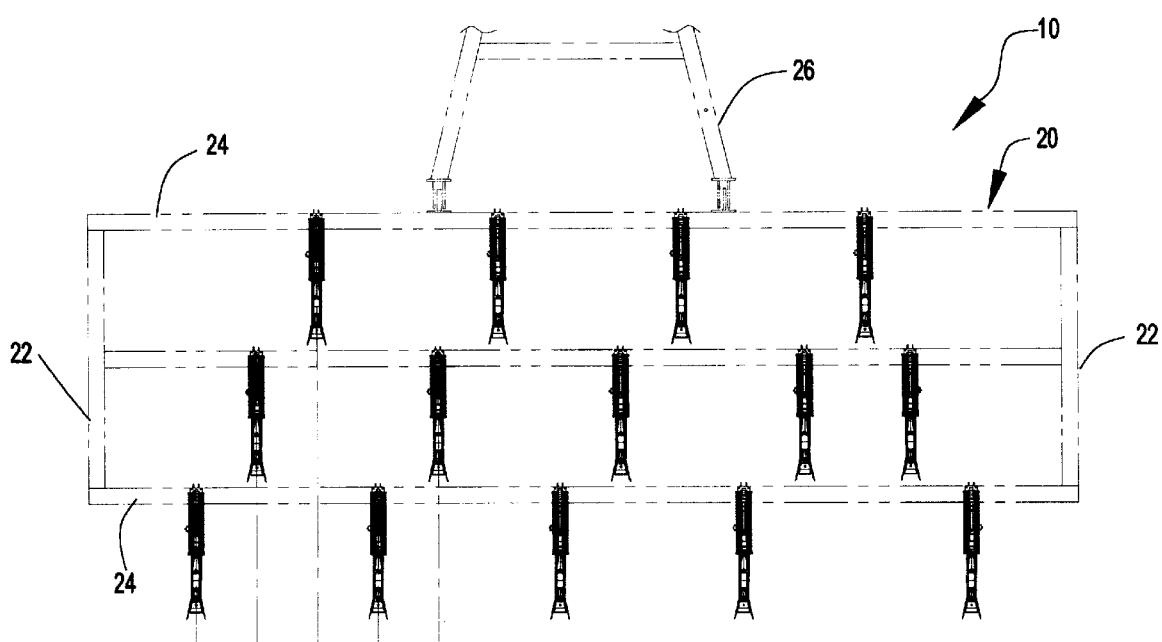
FIG. 2 is a top view of the present invention.

As best shown in FIG. 2 of the drawings, the conventional implement frame 20 comprises a pair of side members 22, three support members 24 and a hitch structure 26. It can be appreciated by one skilled in the art that various other shapes and designs may be utilized for the conventional implement frame 20.

Figure 3:
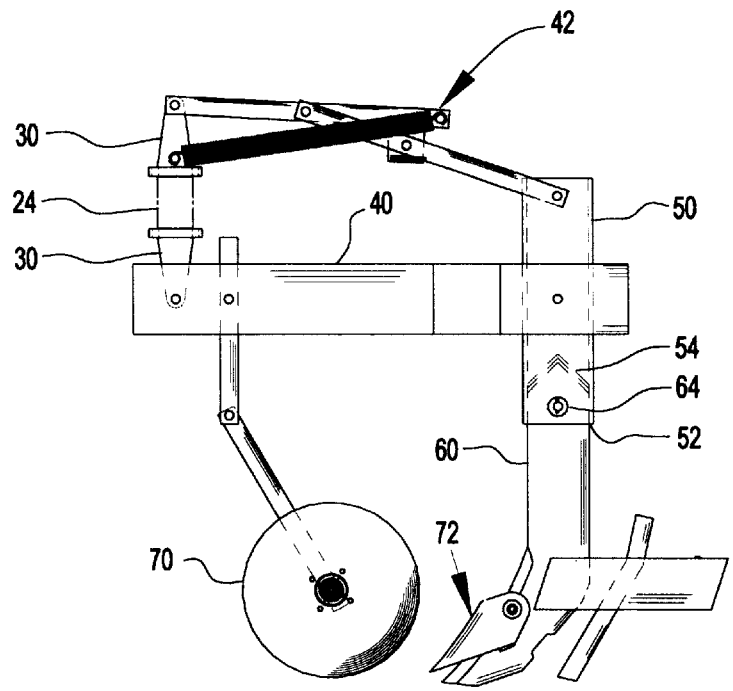
FIG. 3 is a side view of the present invention with a shank planter attached.
Figure 4:
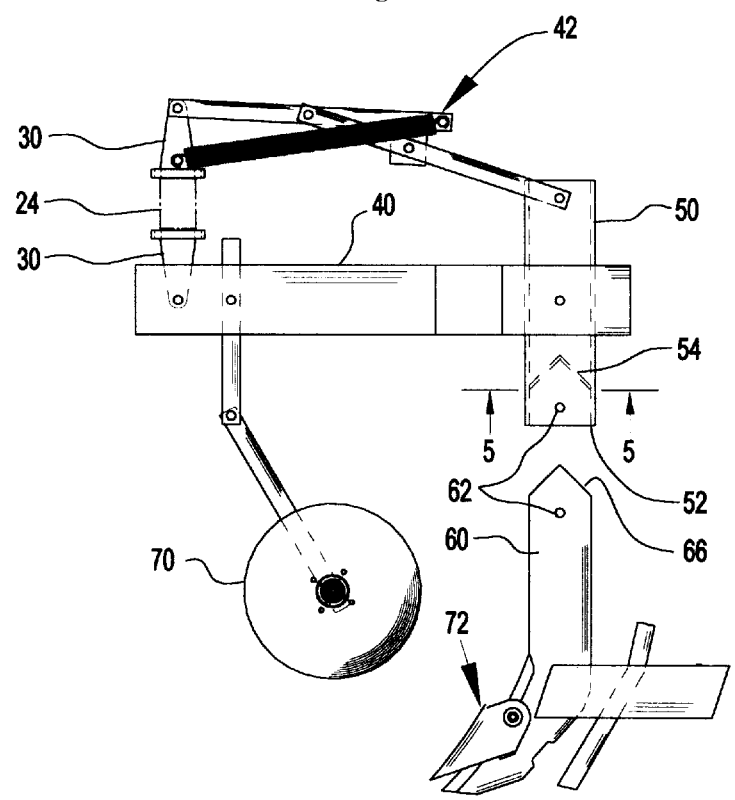
FIG. 4 is an exploded side view of the present invention with a shank planter attached.

The present invention is comprised of a plurality of units attached to the implement frame 20 as shown in FIG. 2 of the drawings. Since each of the units are identical, only one unit will be discussed in detail. As best shown in FIG. 1, a pair of opposing brackets 30 are mountable upon one a support member 24 of the implement frame 20. One or more support arms 40 pivotally extend from the lower bracket 30 as shown in FIGS. 1, 3 and 4 of the drawings. A coulter disc 70 may be attached to a front portion of the support arms 40.

As further shown in FIGS. 1, 3 and 4 of the drawings, a conventional breakaway structure 42 is attached to the upper bracket 30. A receiving arm 50 is pivotally attached between the distal end of the support arms 40 as best shown in FIG. 1. As also shown in FIG. 1 of the drawings, the upper end of the support arm is connected to the distal end of the breakaway structure 42 in order to retain the receiving arm 50 in a substantially vertical position during operation. It can be appreciated that if enough force is applied to the lower end of the receiving arm 50 that the breakaway structure 42 will allow rearward and upward movement of the receiving arm 50 to prevent damage to the implement device attached thereto.

Figure 5:
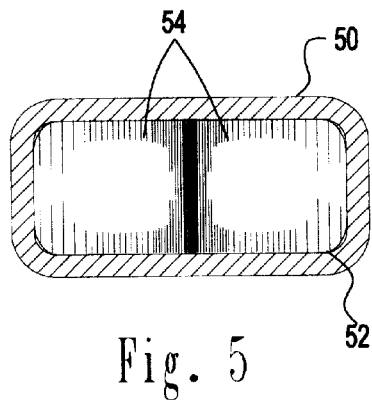
FIG. 5 is a cross sectional view taken along line 5—5 of FIG. 4.

As best shown in FIG. 5, the receiving arm 50 has an open end 52 that is preferably rectangular in shape. The open end 52 exposes a rectangular bore within the receiving arm 50 that extends longitudinally within a finite distance. As shown in FIGS. 3 through 5 of the drawings, a brace 54 is secured within the bore of the receiving arm 50 a finite distance there within. The brace 54 preferably is synclined shaped with the pointed end extending upwardly toward the upper end of the receiving arm 50.

As shown in FIG. 4 of the drawings, a shank member 60 is provided having a generally rectangular cross-section that is removably receivable by the receiving arm 50. The shank member 60 further includes an upper syncline end 66 for matingly connecting with the brace 54 within the receiving arm 50 as shown in FIG. 3 of the drawings.

As further shown in FIG. 4, the shank member 60 and the receiving arm 50 both have a corresponding aperture 62 for receiving a pin 64. The pin 64 retains the shank member 60 snugly positioned within the receiving arm 50 with the syncline end 66 juxtaposed to the brace 54 to prevent movement.

Figure 6:
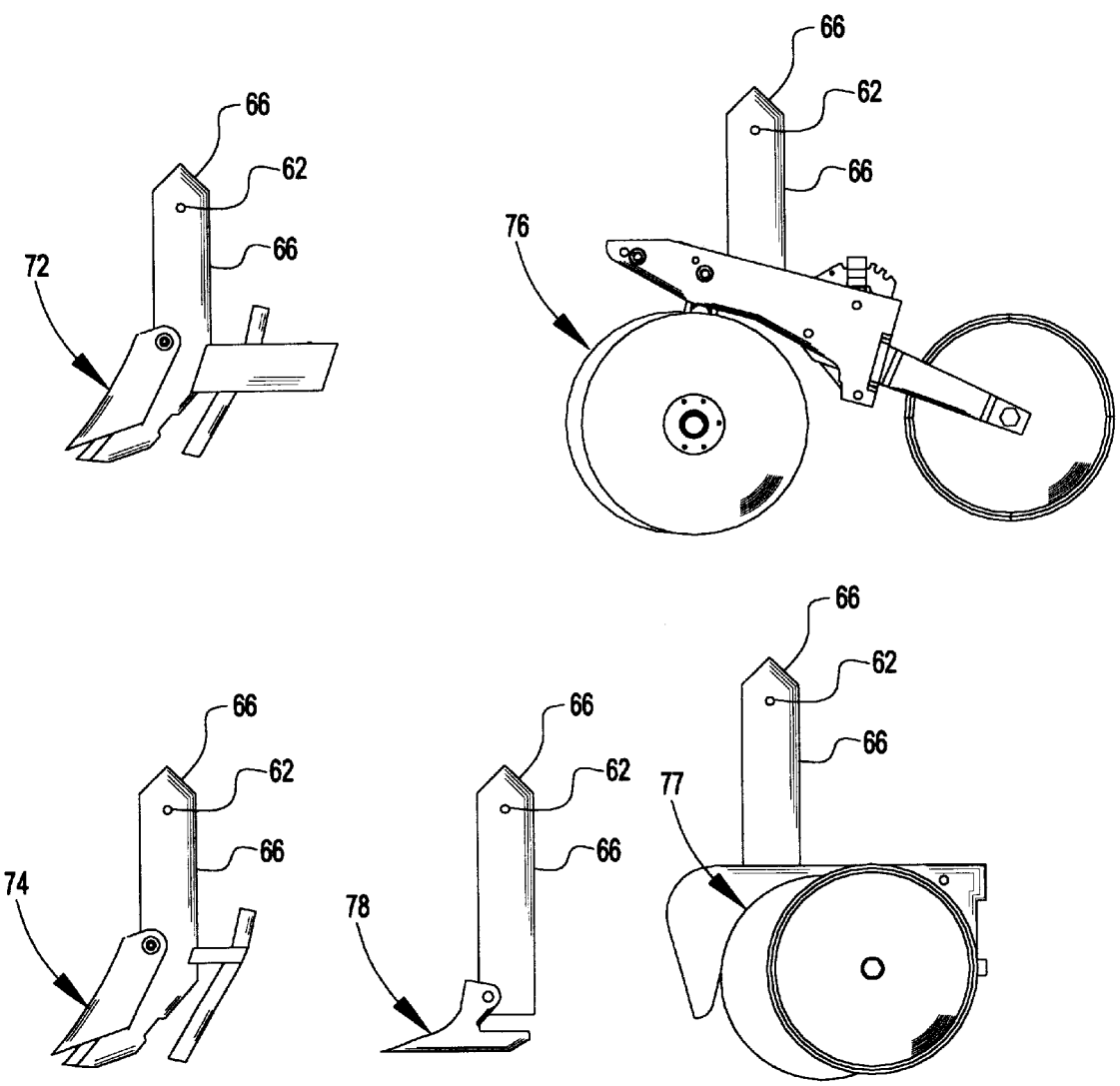
FIG. 6 is a side view of the multiple attachments that are removably attachable to the present invention.

As shown in FIG. 6 of the drawings, there are multiple implement devices 72, 74, 76, 77, 78 that may be connected to the shank member 60. A shank planter 72 may be attached to the lower portion of the shank member 60. The anhydrous applicator 74 may also be attached to the lower portion of the shank member 60. In addition, a double-disc opener 76 may be attached to the lower portion of the shank member 60 to decrease the row spacing to 7½ inches. A corn planter attachment 77 may be attached to the lower portion of the shank member 60 for planting corn. Finally, a tillage attachment 78 may be attached to the lower portion of the shank member 60 for tillage operations. It can be appreciated that this list is not exhaustive of all possible implement devices that may be attached to the lower portion of the shank member 60.

As shown in FIG. 2 of the drawings, the spacing X between the rows is preferably 15 inches. By taking out every other of the shank members 60 out from the corresponding receiving arm 50, the row spacing may be increased to 30 inches. Finally, if the user attaches a plurality of shank members 60 with a double-disc opener 76 attached to them, the row spacing may be reduced to 7½ inches if desired. As can be appreciated by one skilled in the art, various other spacings may be achieved by manipulating the brackets 30.

In operation, if the user desires to break-up a field, he would connect the shank member 60 with the tillage attachment 78 attached thereto. He would continue to connect the other shank members 60 until the implement frame 20 was converted into a tillage apparatus. The user then utilizes the implement frame 20 to till the field's soil. If the user then desires to plant corn, he simply removes the shank members 60 with the tillage attachments 78 attached thereto and installs the shank members 60 with the corn planter attachments 77 attached thereto. If the user desires to then apply anhydrous to another field, he simply removes the shank members 60 with the corn planter attachments 77 attached thereto and installs the shank members 60 with the anhydrous applicators 74 attached thereto. The above process can obviously be completed in different steps with different attachments.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A versatile implement system having a conventional implement frame along with a plurality of units attached thereto, wherein each of said plurality of units comprising:
   at least one support arm pivotally attached to said implement frame;
   a receiving arm pivotally attached to said at least one support arm;
   wherein said receiving arm includes an open end and a bore;
   a shank member having a cross-section similar to said bore and removably receivable by said bore;
   an implement device attached to a lower end of said shank member;
   a securing means for removably securing said shank member within said receiving arm;
   wherein said receiving arm includes a brace within said bore for being juxtaposed to an upper end of said shank member;
   wherein said brace is syncline shaped; and
   wherein said upper end of said shank member is syncline shaped for snugly fitting with said brace.

2. The versatile implement system of claim 1, wherein said securing means comprises:
   at least one aperture through said shank member and said receiving arm; and
   at least one pin projecting through said at least one aperture for retaining said shank member within said receiving arm.

3. The versatile implement system of claim 1, wherein said receiving arm and said bore have a corresponding rectangular shape.

4. The versatile implement system of claim 1, including a breakaway means for allowing said receiving arm to move upon engaging an immovable object.

5. A versatile implement system having a conventional implement frame along with a plurality of units attached thereto, wherein each of said plurality of units comprises:
   a receiving arm, wherein said receiving arm includes an open end and a bore;
   a shank member removably receivable within said bore;
   an implement device attached to a lower end of said shank member;
   a means for removably securing said shank member within said receiving arm;
   wherein said receiving arm includes a syncline shaped brace within said bore for being juxtaposed to an upper end of said shank member; and
   wherein said upper end of said shank member is formed for snugly fitting with said brace.

6. The versatile implement system of claim 5, wherein said means for securing comprises:
   at least one aperture through said shank member and said receiving arm; and
   at least one pin projecting through said aperture for retaining said shank member within said receiving arm.

7. The versatile implement system of claim 5, wherein said receiving arm and said bore have a corresponding rectangular shape.

8. The versatile implement system of claim 5, wherein said shank member and said bore have similar cross sectional shapes.

9. A versatile implement system having a conventional implement frame along with a plurality of units attached thereto, wherein each of said plurality of units comprises:
   a receiving arm, wherein said receiving arm includes an open end and a bore extending from said open end into said receiving arm;
   a shank member removably receivable within said bore;
   an implement device attached to a lower end of said shank member;
   a means for removably securing said shank member within said receiving arm;
   wherein said bore includes a syncline shaped enclosed upper portion for being juxtaposed to an upper end of said shank member; and
   wherein said upper end of said shank member is formed for snugly fitting with said upper portion of said bore.

10. The versatile implement system of claim 9, wherein said means for securing comprises:
    at least one aperture through said shank member and said receiving arm; and
    at least one pin projecting through said aperture for retaining said shank member within said receiving arm.

11. The versatile implement system of claim 9, wherein said receiving arm and said bore have a corresponding rectangular shape.

12. The versatile implement system of claim 9, wherein said shank member and said bore have similar cross sectional shapes.

* * * * *